UNITED STATES PATENT OFFICE.

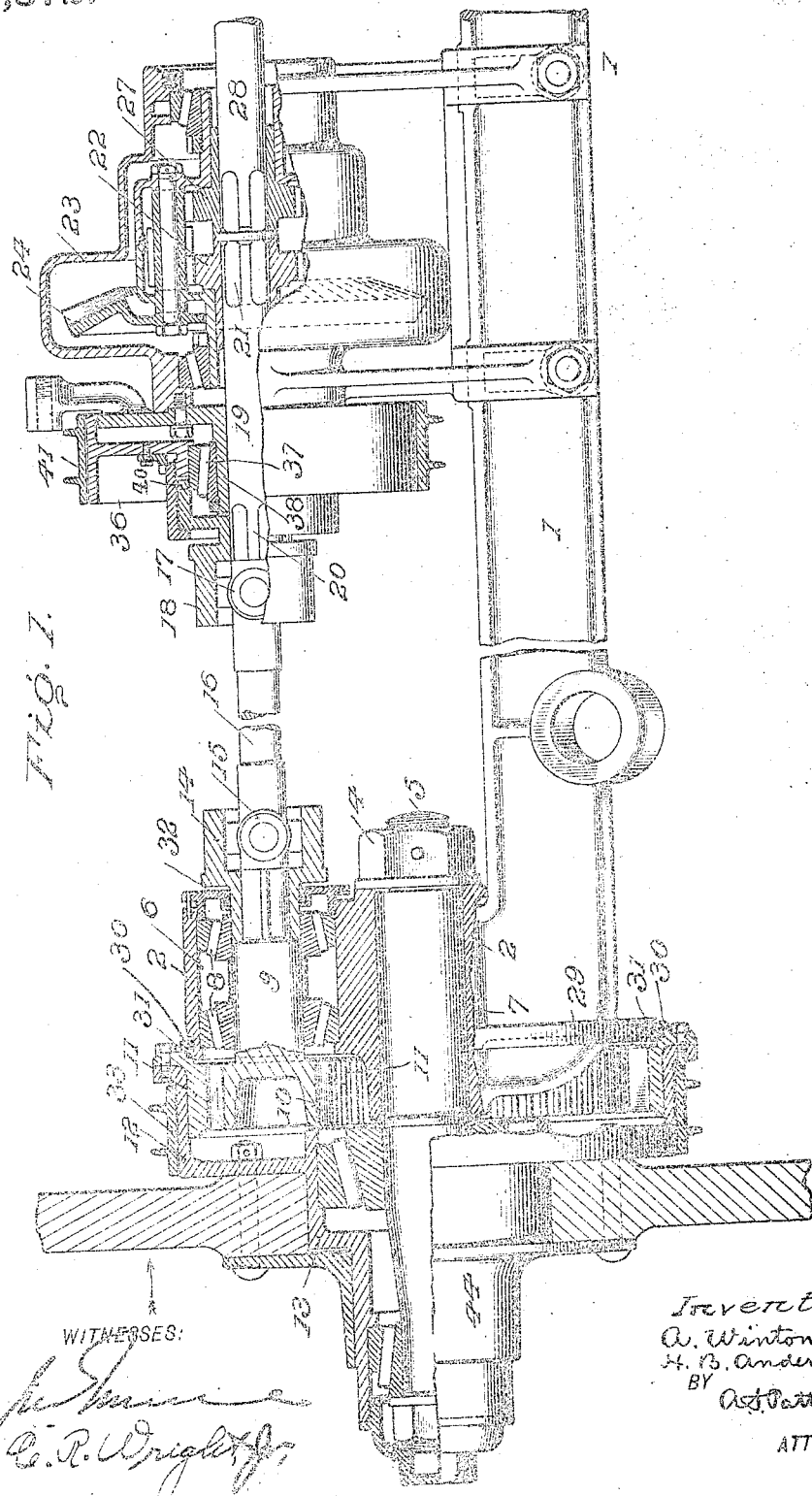

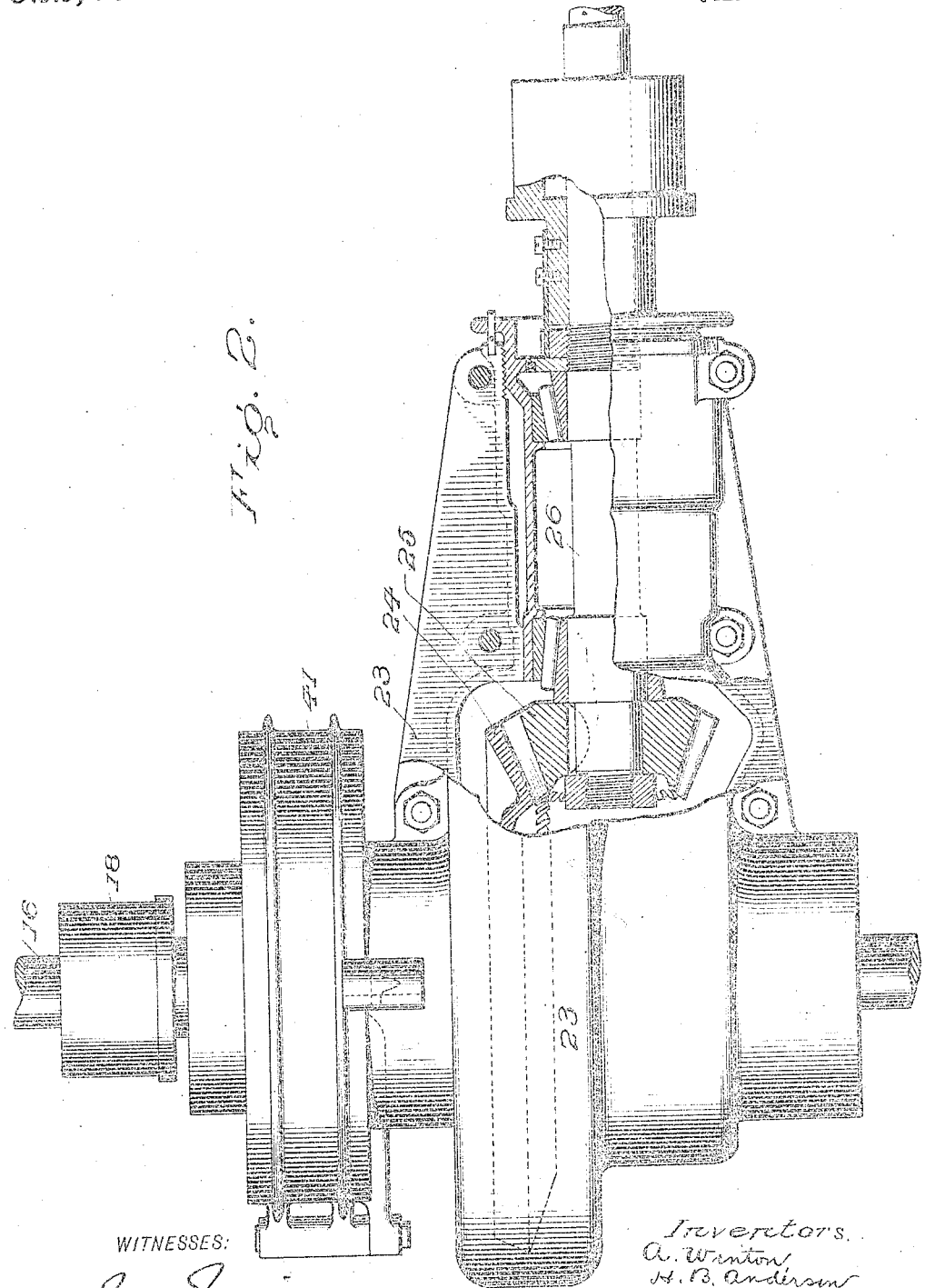

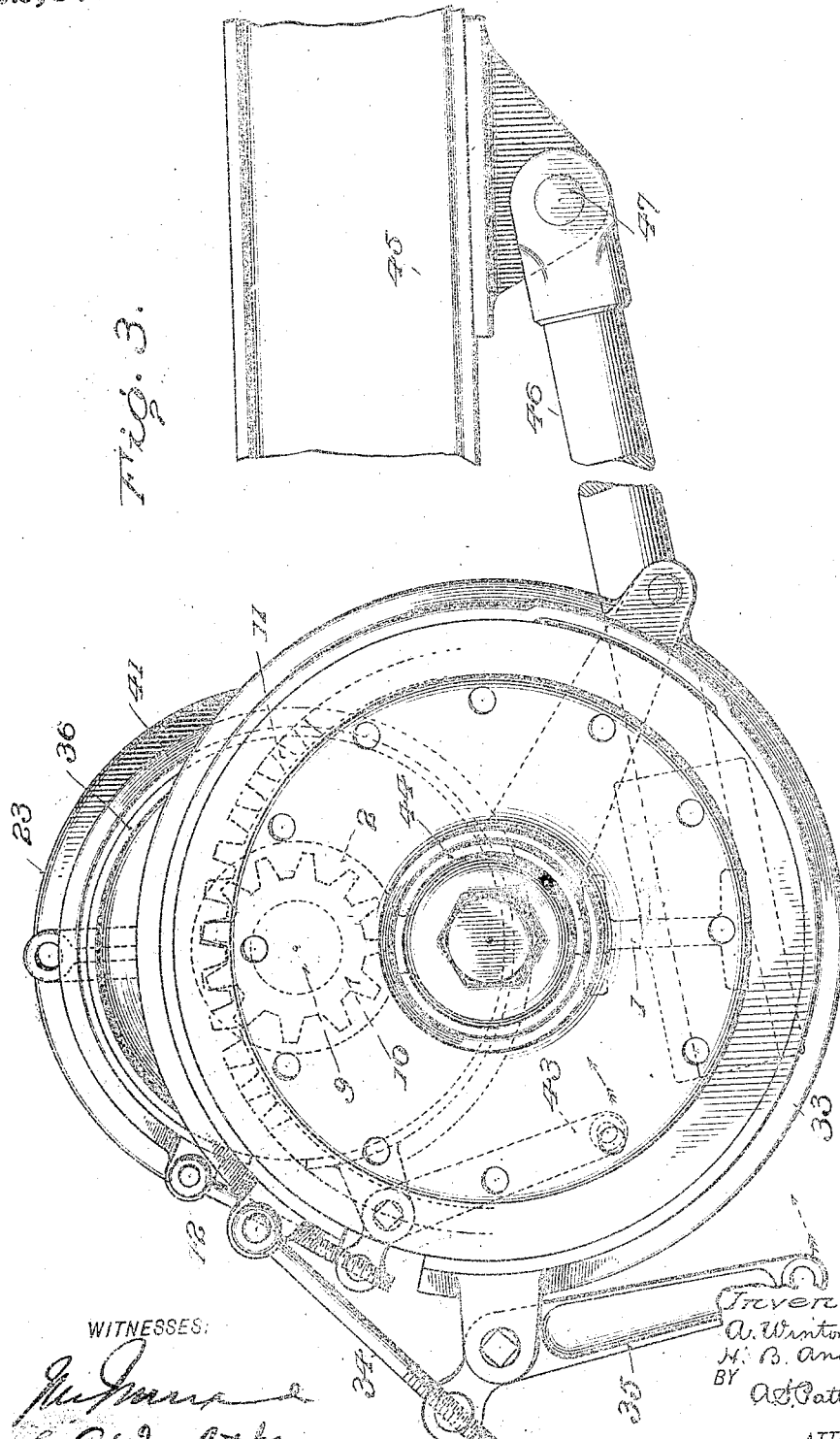

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

PROPELLING MECHANISM FOR MOTOR-DRIVEN VEHICLES.

No. 922,872.  Specification of Letters Patent.  Patented May 18, 1909.

Application filed October 30, 1906. Serial No. 341,288.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Propelling Mechanism for Motor-Driven Vehicles, of which the following is a specification, reference being had therein to the accompanying drawing.

This invention relates to improvements in propelling mechanism for motor driven vehicles, and is especially designed for heavy vehicles such as trucks, and delivery wagons, the primary object of which is to obviate the use of the usual chains for driving the rear wheels, which are exposed to the dirt and weather, and to so construct the mechanism that it is not necessary for the axis of the driving wheels to be in a line with each other, whereby in the case of collision, overloading, or other accident, which may materially alter their alinement, the drive mechanism will be as efficient as when the axis of the two driving wheels were parallel.

In the accompanying drawings, Figure 1 is a rear, longitudinal, sectional view of the intermediately-arranged compensating gearing, and one of the driving wheels. Fig. 2 is a top plan view of the housing which contains the compensating gear, the same being shown partly in section. Fig. 3 is an end view of the wheel hub looking in the direction indicated by arrow in Fig. 1.

In carrying out the present invention, a solid rear axle 1 is provided, and this rear axle has at each end formed integral therewith, an upwardly extending projection 2. These projections are bored out to receive the inner ends of the driving wheel spindles 3, and these are held in position against endwise movement by means of suitable nuts 4 placed upon the screw-threaded inner ends 5 of the spindles. These projections 2 are also provided with openings or passages 6 located above the wheel spindle passages 7 and parallel therewith. The openings 6 are provided for the purpose of receiving suitable bearings 8 for the pinion shaft 9. The outer end of this pinion shaft carries a pinion 10 which is in mesh with an internal gear 11 formed upon an annular member which is clamped to the brake-flange 12, and the latter is preferably formed integral with the wheel-hub 13, as shown in Fig. 1.

The inner end of the pinion shaft 9 is made angular in cross section and enters a socket member 14, in which socket member is a universal joint connection 15 for the outer end of a propelling shaft 16. The opposite end of this propelling shaft is provided with a universal joint 17, and a socket 18 similar to the socket and joint 14 and 15 at the other end of the shaft. The socket 18 receives one end of a short shaft 19 which has its end angular in cross section to enter the said socket, as at 20, while the other end 21 of the shaft is likewise angular in cross section and enters a correspondingly shaped opening in one of the master gears 22 of the compensating mechanism. This compensating mechanism is contained in a housing 23 and is of the usual well known type which is provided with a beveled driving gear 24, and need not therefore be further described, except to say that the beveled gear 24 is in mesh with a pinion 25 (Fig. 2) carried upon the end of a driving shaft 26.

Thus far we have described the mechanism for driving one of the driving wheels of a vehicle, and the other driving wheel (not here shown) at the other side of the vehicle is similarly constructed, and is connected with the other compensating master pinion 27 through the medium of a short shaft 28, and a shaft similar to the shaft 16 with its sockets and universal joints, and need not be further illustrated and described for the purposes of understanding the present invention. The extremities of the axle 1 have cast thereon circular portions or disks 29, and the wheel-hub carries a circular extension 30 embracing the periphery of these disks 29, and between which is located a felt or other suitable washer 31 to prevent the possibility of dirt entering to the internal gear and pinion, and also for the purpose of retaining a suitable lubricant. Likewise, a felt washer 32 is located around the socket 14 which makes the pinion shaft bearings 8 dirt and dust proof. As here shown, the extension 30 is formed upon the internal gear member 11 which is rigidly connected with the hub brake extension 12.

In Fig. 3, is shown an end view of one of the hub brakes consisting of a band 33, the ends of which are connected by a link 34 and a lever 35, the extremity of the latter being suitably connected with an operating rod (not shown). There is also provided, in addition to these two hub brakes, a compensating gear brake 36, and this brake 36 is provided with a roller or other suitable bearing 37 independent of the stub shaft 19, and the bearing is carried upon an extension 38 which is stationary. This construction brings the braking strain on the stationary member without any tendency to produce a bending or binding effect upon the rotating member. We have shown but one of these brake drums 36, but preferably there will be a similarly constructed one at the opposite side of the compensating housing 23. While the brake drum 36 is smaller than the brake drum 12, it is equally as efficient, inasmuch as the shaft with which it is connected rotates at much higher speed than the wheel which carries the brake drum 12. The brake drums 36 are driven through suitable jaw clutches 40.

As illustrated in Fig. 3, the brake band 41 for the drum 36 is operated by a link 42 and lever 43. The rear axle housing 23 is split horizontally, which permits the upper half to be removed, and the compensating mechanism removed by withdrawing the stub axles 19 and 28.

In the construction of the mechanism for driving the propelling wheels 44, the wheel can be removed without disturbing the driving pinion 10. The driving pinion can also be removed by detaching the universal propelling shaft 16, since the pinion and roller bearings are constructed large enough in diameter to allow the pinion to pass through the hole or passage-way 6 which they occupy when in position.

From the foregoing description it will be seen that it is only necessary for the pinion and wheel axle to be parallel in order to have the drive taken care of under all conditions, and that the axes of the other driving wheel and other pinion do not need to coincide or be parallel with those of the first drive wheel, inasmuch as the drive from the compensating mechanism to the pinion is communicated through the universal joints. As the projections on the end of the axle which carry the pinion and axle spindles are made very strong and substantial, there is no possibility of the bending thereof to disturb the alinement of the axis of the pinion and the axis of the wheel in any ordinary accident or collision. Should the rear axle 1 be bent, or other displacement take place which will throw the axis of one driving wheel out of line with the other driving wheel, the drive would be as efficient as though the axles were parallel, because of the universal connection between the compensating mechanism and the pinion.

The housing 23 has its lower portion connected with the forward part 45 of the vehicle through the medium of radius rods 46 which have their forward ends pivoted as at 47.

Having thus described our invention, what we claim and desire to secure by Letters Patent, is:—

1. A driving mechanism comprising a supporting axle having up-turned ends, said up-turned ends provided with spindles sockets and driving shaft bearings, outwardly-projecting spindles having their inner ends firmly secured in said sockets, an upwardly extending compensating mechanism secured to said axle at a point between said up-turned ends, driving wheels carried by said projecting spindles, gears carried by said wheels, and driving shafts projecting from the compensating mechanism and carrying gears meshing with said wheel gears.

2. A driving mechanism comprising a supporting axle, a propelling wheel at each end thereof provided with a gear, pinions meshing with said gears, a compensating mechanism intermediately supported by the axle, and universal jointed shafts connecting the pinions, said shafts capable of free longitudinal movement independent of said pinions, and said compensating mechanism while co-operating.

3. A driving mechanism comprising a supporting axle having up-turned ends provided with outwardly-projecting driving wheel spindles and driving shaft bearings, an upwardly projecting compensating mechanism connected with the depressed portion of the axle, driving wheels on said spindles and driving shafts connecting the compensating mechanism and said driving wheels.

4. A propelling mechanism comprising a supporting axle carrying at each end a drive wheel provided with a gear, pinions meshing with the said gears, the pinions provided with inwardly-extending shafts, a compensating mechanism intermediate the axle, a stub shaft having one end interlocking with the compensating mechanism, and universal jointed propelling shafts having one end interlocking with the pinion shafts and their other ends interlocking with the opposite ends of the stub shafts.

5. A driving mechanism comprising a supporting axle, driving wheels journaled at opposite ends thereof and provided with inwardly-extended concentrically-arranged internal gears, pinions in mesh therewith, a driving mechanism operatively connected with the pinions, the extremities of the axle having circular disks arranged concentric with the internal gears, the said disks and internal gear flanges telescoping, and a dirt and dust proof packing located between the telescoping members.

6. A driving mechanism, comprising a supporting axle, driving wheels journaled at opposite ends thereof and provided with gears, propelling pinions in mesh with the said gears, a compensating mechanism supported intermediate the axle, a propelling shaft connecting the pinions and the compensating mechanism, a brake drum supported independently of the driving mechanism, the drum and propelling shaft having interlocking members.

7. A driving mechanism comprising a supporting axle, driving wheels journaled at opposite ends thereof, a compensating mechanism operatively connected with the driving wheels, a housing for the compensating mechanism a laterally projecting flange connected to the housing, a brake drum journaled upon the flange and operatively connected with the compensating mechanism.

8. A driving mechanism comprising a supporting axle, driving wheels at opposite ends thereof, a compensating mechanism operatively connected with the driving wheels, a housing for the compensating mechanism, and a journaled brake drum supported by said housing and connected with the compensating mechanism.

9. A driving mechanism comprising a supporting axle, driving wheels at opposite ends thereof, a compensating mechanism arranged between said wheels, shafts connecting the driving wheels and compensating mechanism, and a brake drum connected with one of said shafts at a point between the compensating mechanism and said driving wheels for the purpose described.

In testimony whereof we affix our signatures in presence of two witnesses.

ALEXANDER WINTON.
HAROLD B. ANDERSON.

Witnesses:
. O. F. BAUGHMAN,
W. J. WARD.